United States Patent [19]

Vangarde

[11] Patent Number: 5,504,812

[45] Date of Patent: Apr. 2, 1996

[54] HEADSET FOR USE WITH A RADIOTELEPHONE

[75] Inventor: Lawrence A. Vangarde, Kenosha, Wis.

[73] Assignee: Motorola, Inc., Schaumburg, Ill.

[21] Appl. No.: 320,719

[22] Filed: Oct. 11, 1994

[51] Int. Cl.[6] .................................................. H04M 1/00
[52] U.S. Cl. ........................................................ 379/430
[58] Field of Search .................................. 379/430, 433; 381/183, 187

[56] References Cited

U.S. PATENT DOCUMENTS

| | | | |
|---|---|---|---|
| 4,484,029 | 11/1984 | Kenney | 379/430 |
| 4,782,527 | 11/1988 | Williamson et al. | 379/430 |
| 4,893,331 | 1/1990 | Horiuchi et al. | 379/430 |
| 5,177,784 | 1/1993 | Hu et al. | 379/430 |
| 5,191,602 | 3/1993 | Regen et al. | 379/58 |

*Primary Examiner*—Jeffery Hofsass
*Assistant Examiner*—Jack Chiang
*Attorney, Agent, or Firm*—Dale B. Halling; Donald C. Kordich

[57] ABSTRACT

A headset (10) for a radiotelephone (12) has a boom (16) that pivots about a housing (13). The headset (10) has a speaker (20) and a microphone (18). A headset detect circuit (33) determines when the headset connector (24) has been plugged into the radiotelephone's jack (26) and signals the microprocessor (60). The microprocessor (60) then connects the transmitter (68) and the receiver (70) to the headset's microphone (18) and speaker (20). To answer a call the user rotates the boom (16), either clockwise or counter clockwise, which closes a three position switch (30) and sends an off-hook signal (44) to a microprocessor (60). To end a call the user rotates the boom (16) up so it is parallel with the housing (13)

5 Claims, 3 Drawing Sheets

HEADSET FOR USE WITH A RADIOTELEPHONE

FIELD OF THE INVENTION

This invention relates generally to the field of radiotelephones and more particularly to headsets for radiotelephones.

BACKGROUND OF THE INVENTION

Businessmen and secretaries, who use the telephone extensively, often need to be able to take notes or perform other functions with their hands while carrying on a phone conversation. Having to hold the telephone handset constantly limits the ability of these users to work efficiently and leads to ear and arm fatigue. Headsets for conventional landline telephones have provided a solution for a number of users. However, with the advent of cellular or radiotelephones more and more phone conversation occur over radiotelephones instead of conventional telephones.

Since, radiotelephones do not function in the same manner as a conventional telephone, a conventional headset will not work with a radiotelephone. The need for a headset that works with a radiotelephone is even greater than for a conventional telephone, since the user is often mobile when using his radiotelephone. Thus, there exists a need for a headset that is compatible with radiotelephones.

Headsets in the past have been designed either for right handed or left handed users. This results in increased production costs and extra expense to accommodate both left and right handed users. As a result, there exists a need for a headset that is compatible with both left and right handed users.

DETAILED DESCRIPTION OF THE DRAWINGS

Figure 1:
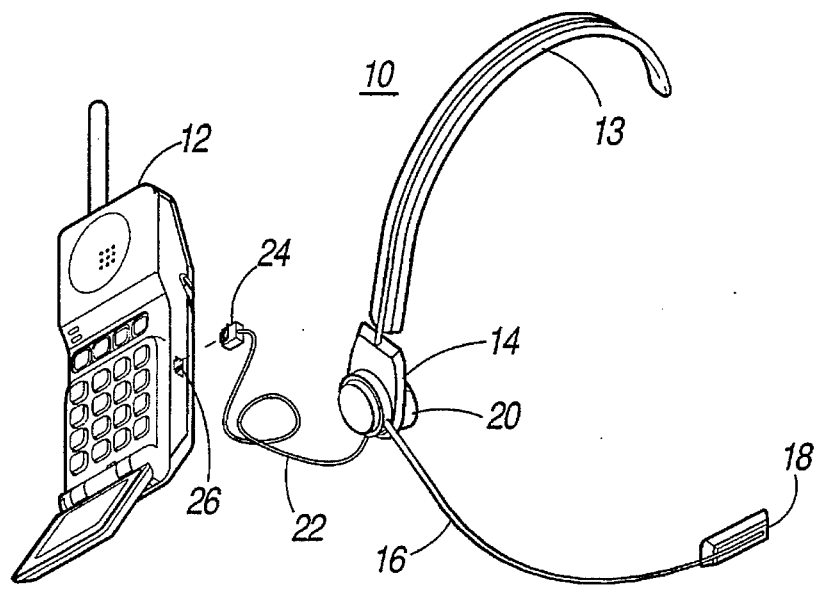
FIG. 1 is a perspective view of a radiotelephone and an associated headset.

FIG. 1 illustrates a headset 10 for use with a radiotelephone 12. The headset 10 has a housing 13 connected by a pivot 14 to a boom 16. A microphone 18 is contained at the end of the boom 16. A speaker 20 is contained within the pivot 14. The headset 10 connects to the radiotelephone 12 through a cord 22 having a connector 24 that mates with a jack 26 in the radiotelephone 12.

Figure 2:
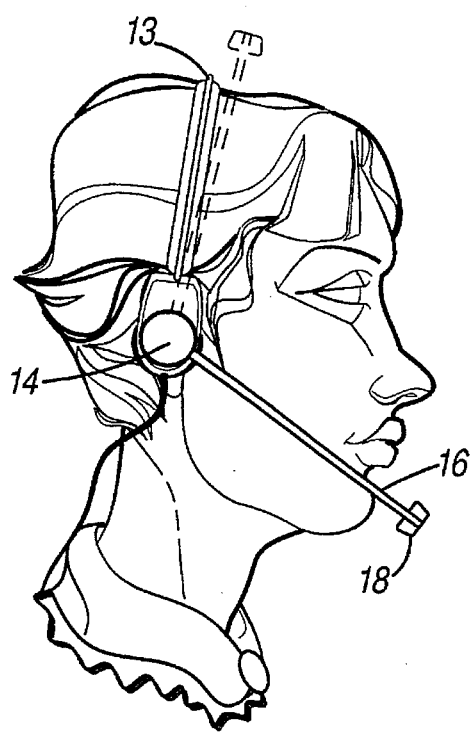
FIG. 2 is a side view of a user wearing the headset of FIG. 1.
Figure 3:
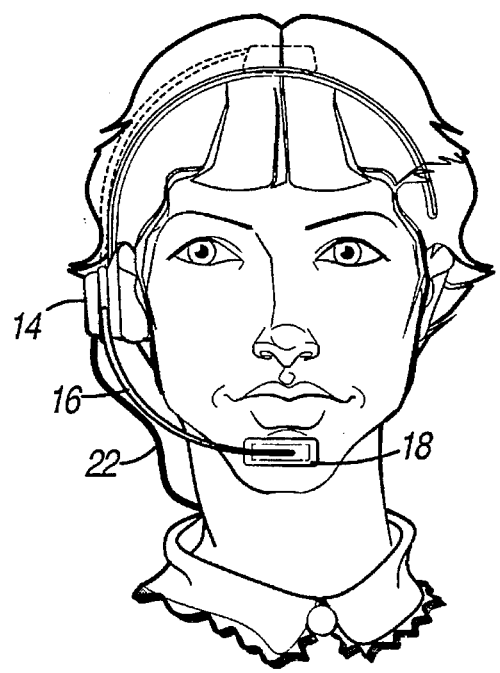
FIG. 3 is a front view of a user wearing the headset of FIG. 1.

FIGS. 2 and 3 show the headset 10 in use. When a user rotates the boom 16 from the stored position, on top of the user's head, to the active position a switch 30 (see FIG. 4) closes. The closing of the switch 30 places the radiotelephone 12 in the off-hook position, in which a telephone call can be received. As can be seen from these drawing this allows a user to carry on a phone conversation without using his hands.

Figure 4:
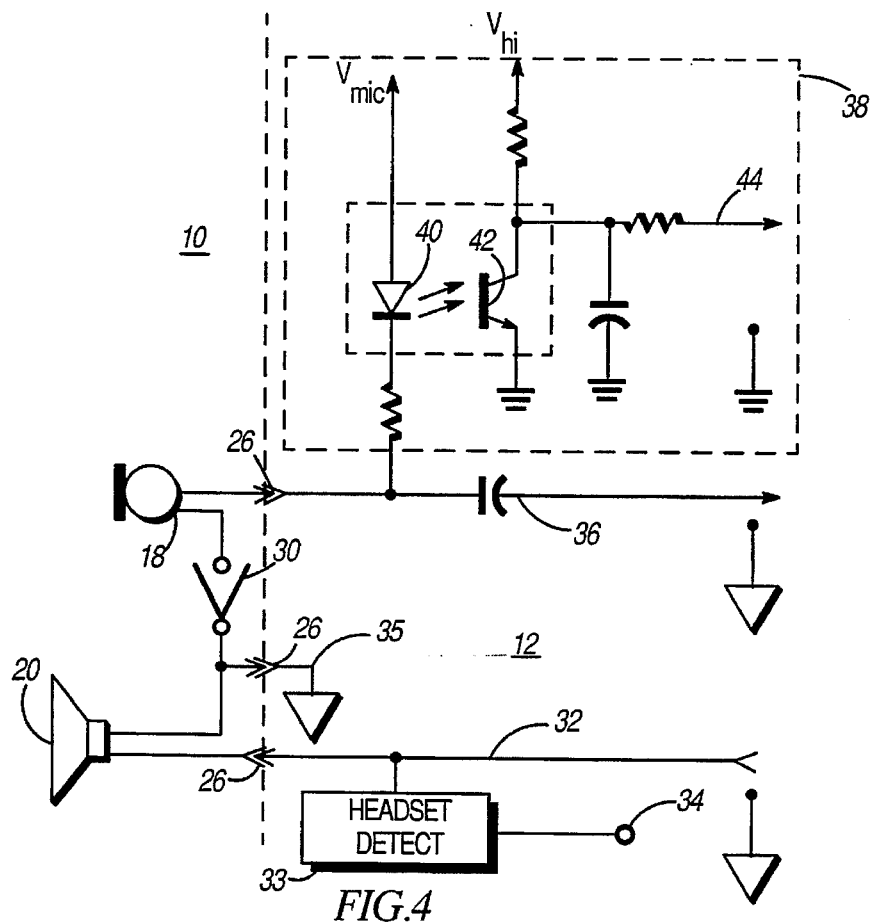
FIG. 4 is a circuit diagram of the headset and part of the radiotelephone.

FIG. 4 shows a circuit diagram of the headset 10 and associated parts of the radiotelephone 12. The jack 26 has three connections to three conductors in the radiotelephone 12. A first conductor 32 connects the speaker 20 to the audio output of the radiotelephone 12 and to a headset detect circuit 33. An output 34 of the headset detect circuit 33 is true when the headset 10 is connected to the jack 26. The headset detect circuit 33 senses either a voltage or current change when the headset 10 is connected to the radiotelephone 12.

A second conductor 35 is connected to the radiotelephone's ground, the speaker 20 and one end of the switch 30. The other end of the switch 30 is connected to one end of the microphone 18. A third connector 36 is connected to the audio input of the radiotelephone 12, an off-hook circuit 38 and the other end of the microphone 18.

The boom 16 can be rotated either clockwise or counter clockwise, depending on whether the user is left handed or right handed. The switch 30 is a three position switch and closes whether the boom 16 is rotated clockwise and counterclockwise. When the switch 30 closes, current flows through a photodiode 40. The light from the photodiode 40 causes current to flow through phototransistor 42 causing an off-hook line 44 to go low or true.

Figure 5:
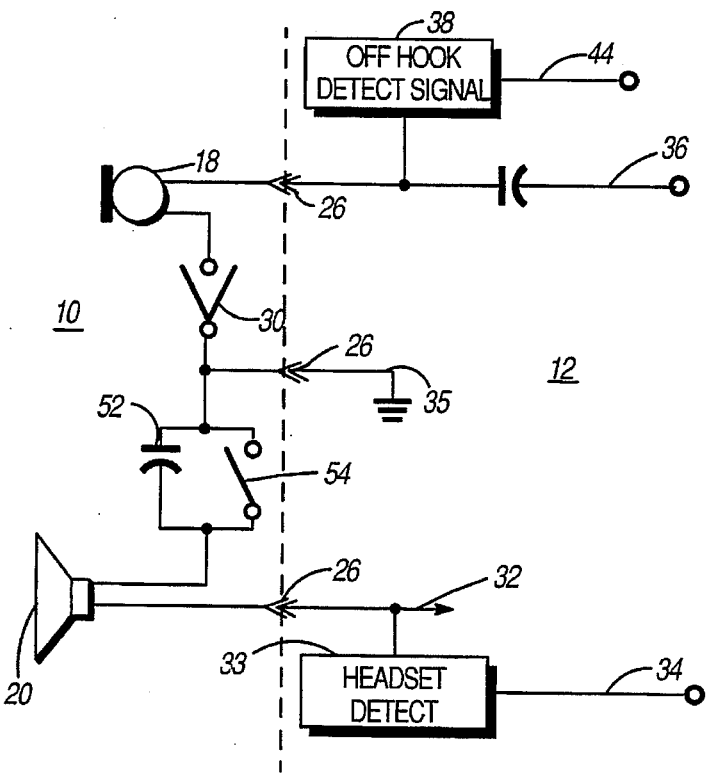
FIG. 5 is an alternative embodiment of the circuit diagram of FIG. 4.

FIG. 5 shows an alternative embodiment of the circuit in FIG. 4, that has a flash hook feature. The circuit differs from the circuit in FIG. 4 in that it contains a capacitor 52 and a momentary switch 54. The momentary switch 54 and the capacitor 52 are connected in parallel and the combination is connected between the speaker 20 and ground. The momentary switch 54 is biased to be normally closed and thus normally behaves like the circuit shown in FIG. 4. When the momentary switch 54 is open the change in voltage or current is detected by the headset detect circuit 33. A change in the voltage or current due to the momentary switch 54 or removal of the headset 10, causes the output 34 to go false. A microprocessor 60 (see FIG. 6) connected to the output 34 determines if the false state is momentary or sustained. If momentary then the microprocessor implements the flash hook features, like three way calls and call transfer features. Otherwise the headset 10 is determined to have been removed.

Figure 6:
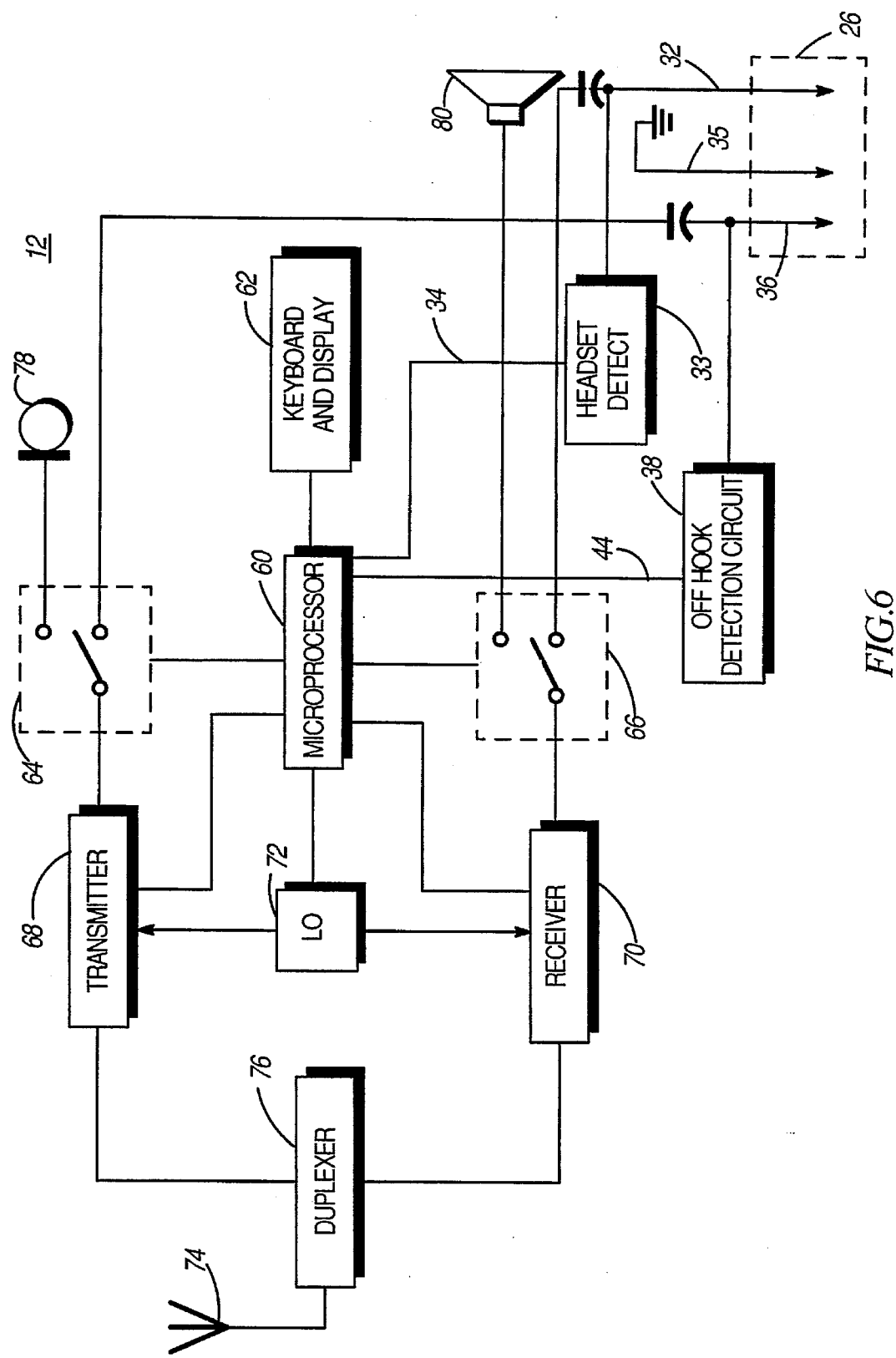
FIG. 6 is a block diagram of the radiotelephone of FIG. 1.

A block diagram of the radiotelephone 12 is shown in FIG. 6. The jack 26 contains the three conductors 32, 35, 36. The third conductor 36 is connected to the off hook detection circuit 38, which is connected via conductor 44 to the microprocessor 60. The microprocessor 60 controls the radiotelephone 12. Specifically, the microprocessor 60 is connected to a keyboard and display 62, a pair of controllable switches 64, 66, a transmitter 68, a receiver 70 and an local oscillator 72. The transmitter 68 and the receiver 70 are both connected to an antenna 74 through a duplexer 76. If the radiotelephone operates in a Time Division Duplexing system the duplexer 76 can be eliminated. The transmitter 68 is connected to the controllable switch 64 which either connects to the conductor 36 of the jack 26 or to a microphone 78 in the radiotelephone's handset. The receiver 70 is connected to a second controllable switch 66 that either connects to the conductor 32 of the jack 26 or to a speaker 80 in the radiotelephone's handset. When the microprocessor 60 receives a true signal from the output 34 of the headset detect circuit 33, the switch 64 is connected to conductor 36 and the second switch 66 is connected to the conductor 32. In this way either the handset's microphone 78 and speaker 80 are enabled or the headset speaker 20 and microphone 18 are enabled, but not both simultaneously. Further, an alert or ring signal is routed to the headset speaker 20 when the output 34 of the headset detect circuit is true. When the user has finished the phone call he simply flips the boom 16 up, so that it is aligned with the housing 13. This sends an on-hook signal to the microprocessor 60 which terminates the phone call.

The radiotelephone 12 and the headset 10 free a user to receive radiotelephone calls by just flipping the boom 16 down. This allows the radiotelephone user to have hands free operation of the radiotelephone. The three way switch 30 in the headset 10 allows headset to be used by either right handed or left handed users. A further embodiment allows the user to have flash hook features while using the headset 10. The present invention provides a headset designed for use with a radiotelephone with the full range of features expected by today's telephone users.

To those skilled in the art it is obvious that many modifications can be made to the invention without departing from the spirit of the invention. For instance, the speaker 20 could be located at the other end of the housing 13 instead of in the pivot 14. Or the momentary switch 54 could be any switch that is normally biased closed. Any such modification is considered to be part of the inventor's exclusive rights in this invention. For a full understanding of the scope of the invention reference should be made to the appended claims.

I claim:

1. A headset for use with a radiotelephone, comprising;
   a connector for attaching to a jack of the radiotelephone;
   a cord, having a plurality of conductors, having a first end attached to the connector;
   a housing connected to a second end of the cord, having a speaker connected between a first conductor leading to the radiotelephone's audio output and a second conductor leading to the radiotelephone's ground;
   a pivot connected to an end of the housing having a switch, the switch connected at a first end to the second conductor leading to the radiotelephone's ground;
   a boom connected to the pivot at a proximal end and having a microphone at a distal end of the boom, said microphone electrically connected at a first end to the second end of the switch and at a second end to a third conductor leading to the radiotelephone's audio input and to an off-hook detection circuit; and
   said switch having two states, open when the boom is aligned with the housing and closed when the boom is pivoted either clockwise or counterclockwise, wherein the microphone is in front of a user's mouth.

2. The headset of claim 1, wherein the off-hook detection circuit has a true output when the switch is closed.

3. The headset of claim 1, further including a capacitor and a momentary switch electrically connected in parallel, the momentary switch and the capacitor being connected between the speaker and the second conductor leading to ground, said momentary switch being normally closed.

4. The headset of claim 3, further including a headset detect circuit that detects when the momentary switch is open.

5. A headset for use with radiotelephone, the headset comprising:
   a housing;
   a pivot connected to the housing;
   a speaker proximally located near the pivot;
   a boom having two ends, wherein one end is connected to the pivot, the boom having a stored position and an active position when either rotated clockwise or counterclockwise from the stored position;
   a microphone located at the second end of the boom;
   a switch having two ends for electrical connection, wherein the speaker is connected to the first end of the switch and the microphone is connected to the second end of the switch, the switch further having an open state and a closed state, the open state corresponding to the stored position and the closed state corresponding to the active position;
   a capacitor; and
   a momentary switch connected in parallel to the capacitor;
   wherein the parallely connected capacitor and momentary switch are serially connected between the speaker and the first end of the switch.

\* \* \* \* \*